United States Patent [19]

Draper

[11] Patent Number: 4,457,555
[45] Date of Patent: Jul. 3, 1984

[54] CONVERSION OF VEHICLE BODIES

[75] Inventor: David L. Draper, Hamburg, Mich.

[73] Assignee: Cars & Concepts, Inc., Brighton, Mich.

[21] Appl. No.: 282,078

[22] Filed: Jul. 10, 1981

[51] Int. Cl.³ .............................................. B62D 21/02
[52] U.S. Cl. ..................................... 296/186; 296/203; 296/194; 296/195; 296/30; 29/401.1; 29/434
[58] Field of Search ................................. 296/185–188, 296/193, 195–197, 203–205, 209, 210, 29, 30; 29/401.1, 434

[56] References Cited

U.S. PATENT DOCUMENTS

| | | | |
|---|---|---|---|
| 2,662,793 | 12/1953 | Lindsay | 296/195 |
| 2,921,812 | 1/1960 | Barenyi | 296/196 |
| 3,423,122 | 1/1969 | Wessells | 296/185 |
| 3,765,715 | 10/1973 | Franchini | 296/188 |
| 4,014,587 | 3/1977 | Eggert, Jr. | 296/204 |
| 4,081,197 | 3/1978 | Ackel | 296/204 |
| 4,294,487 | 10/1981 | Nakamura | 296/188 |
| 4,311,744 | 12/1982 | Watanabe | 296/188 |
| 4,346,930 | 8/1982 | Northey | 296/193 |

Primary Examiner—Robert B. Reeves
Assistant Examiner—Dennis H. Pedder
Attorney, Agent, or Firm—Brooks & Kushman

[57] ABSTRACT

A vehicle body of the convertible or targa type and the method of converting such a body from a sedan type vehicle body in which a reinforcing structure is disposed within the passenger compartment and is fastened thereto to form a centrally extending structural channel member extending longitudinally within the passenger compartment and having forward and rearward transverse portions fastened to the forward and rearward suspension supports of the body to transmit torsional and beaming loads imposed on the vehicle body by the ground engaging wheels.

21 Claims, 14 Drawing Figures

CONVERSION OF VEHICLE BODIES

This invention relates to vehicle bodies of the type having an open passenger compartment and particularly to the conversion of vehicle bodies with rigid roofs to such bodies.

Most automobile manufacturers have discontinued the manufacture of vehicles of the convertible type with a soft-type top closing the passenger compartment or of the targa type with a detachable roof panel. The apparent reason for the discontinuence of such manufacture of those vehicles is that low volume makes manufacture uneconomical. Also such vehicles require reinforcement to afford sufficient strength which in the usual sedan type body is formed by a rigid metal roof panel. The reinforcing that must be added to the convertible or targa body has required the addition of substantial weight thereby undesirably decreasing fuel efficiency. In spite of the manufacturers decisions to discontinue the manufacture of such vehicles, a demand for convertible or targa type vehicles continues and such demand must be met on a customized basis by conversion of conventional sedan type bodies.

It is an object of this invention to provide a vehicle body of the convertible or targa type which maintains proper vehicle strength for crashworthiness and drivability.

It is also an object of the invention to provide a method of converting conventional sedan type vehicles to convertible or targa type vehicle bodies.

Another object of the invention is to provide a body of the convertible or targa type and the method of making it which results in a strong body without the usual increase in weight of the body.

Yet another object of the invention is to provide a vehicle body of the convertible or targa type and the method of making it in which a tunnel is incorporated substantially longitudinally and centrally of the vehicle to absorb bending and torsional loads.

A further object of the invention is to provide a vehicle body of the convertible or targa type and the method of making it in which modification is accomplished from the interior of the vehicle.

Basically the invention provides a vehicle body of the convertible or targa type in which a reinforcing member is installed within the passenger compartment and is joined to the floor pan, the forward and rearward sub-frame to form a central tunnel-like construction having forward transverse and rearward transverse members absorbing loads imposed by the wheels and transmitted through the suspension system to the forward and rearward sub-frame. The reinforcing structure has a generally U-shaped configuration and the main portion extends generally longitudinally of the vehicle and overlies an existing tunnel structure to form a closed tube for absorbing torsional and bending loads. The reinforcing structure has a height no greater than the seat members disposed at opposite sides so that a maximum cross-section is obtained to afford strength. The reinforcing structure includes specifically formed joints which prevent buckling and further add strength and at the same time keep weight at a minimum.

The preferred embodiments of the invention are illustrated in the drawings in which.

Figure 1:
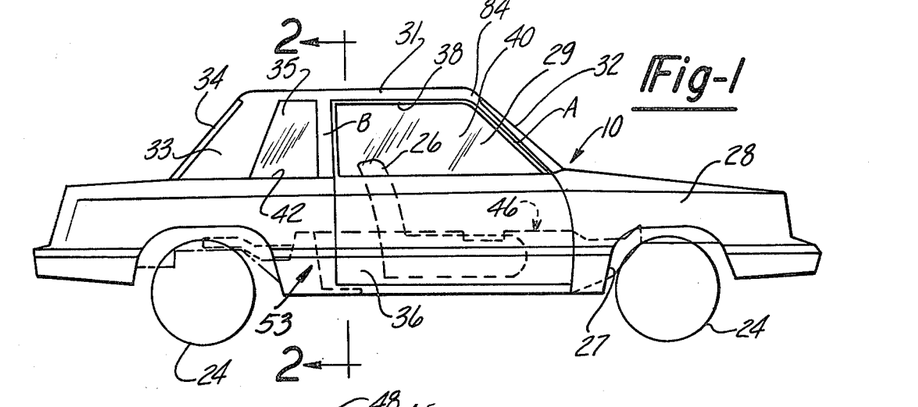
FIG. 1 is a diagrammatic side elevation of a sedan type vehicle which is modified in accordance with principals of the invention.
Figure 2:
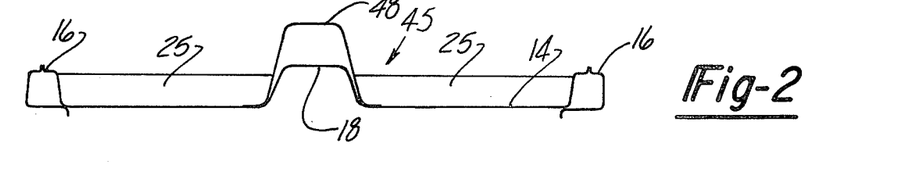
FIG. 2 is a diagrammatic cross-sectional view taken generally on line 2—2 in FIG. 1 and at a slightly enlarged scale.
Figure 4:
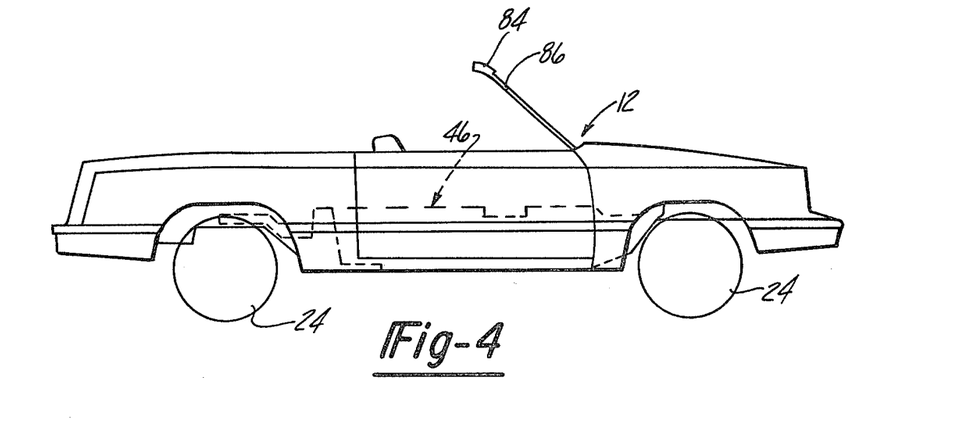
FIG. 4 is a side elevational view of the vehicle in FIG. 1 after the top has been removed.
Figure 5:
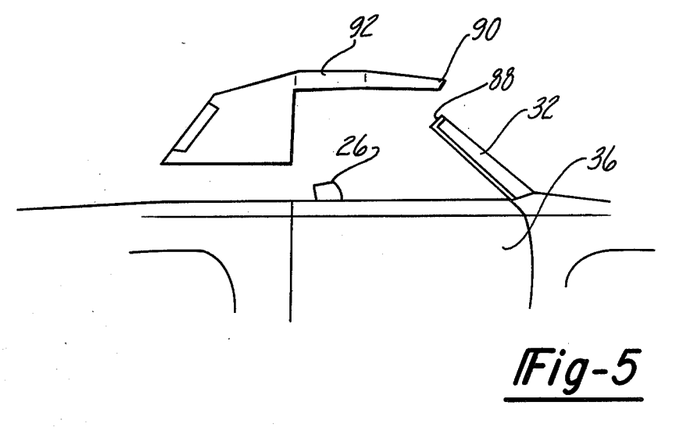
FIG. 5 is a partial view of the vehicle seen in FIG. 4 with parts broken away and removed.
Figure 6:
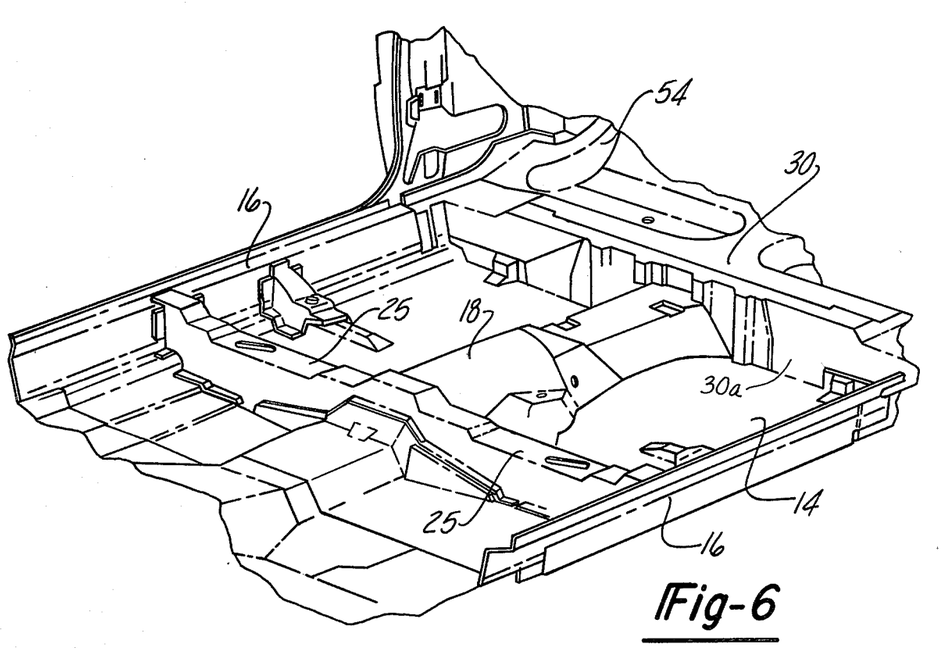
FIG. 6 is a perspective view of a portion of a floor pan of a vehicle body.
Figure 14:
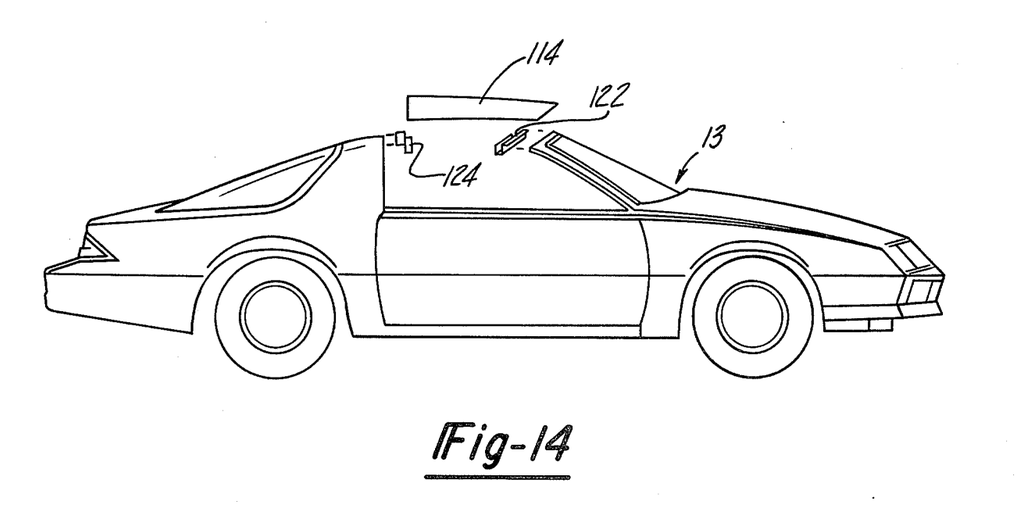
FIG. 14 is an exploded view of a vehicle body of the targa type which also embodies the invention.

In accordance with the preferred embodiment of the invention a conventional sedan type body indicated at 10 in FIG. 1 is modified and converted into a convertible body indicated generally at 12 in FIG. 4 or targa body indicated at 13 in FIG. 14. Referring to FIGS. 1 and 2 the sedan body 10 is of the self-supporting or unitized type and includes a floor pan 14, and rocker panels 16 at opposite sides which serve to reinforce the floor pan. A tunnel 18 opens downwardly and is disposed centrally of the vehicle. As shown in FIG. 6, the tunnel 18 has an irregular shape. Such tunnels can be used for the purpose of housing a drive shaft for rear wheel drive vehicles or the exhaust system for front wheel drive vehicles. The longitudinally extending tunnel 18 serves to strengthen the floor pan 14 in a longitudinal direction. The floor pan 14 also is formed integrally with a forward sub-frame made up of a pair of side sub-frame members 20 and a rearward sub-frame made up of a pair of rearward sub-frame members 22. The forward and rearward sub-frame members 20, 22 form the foundation for the suspension system (not shown) which includes the ground engaging wheels 24.

The floor pan 24 also is shown as including a formed cross member or cross beam 25 which extends from the tunnel 18 to the rocker panels 16 at opposite sides of the floor pan 14. The cross member or cross beam 25 serves to reinforce and stiffen the floor pan and act as a support or anchor for such equipment as seats 26 and for safety belts, not shown.

The forward portion of the floor pan typically slopes upwardly and forwardly of the front wheels 24 to form a firewall 27 separating the engine compartment 28 and the passenger compartment 29. The rear portion of the floor pan 14 has a slightly elevated deck 30 (FIG. 6) merging with the tunnel 18 and forming a support for rear seats, not shown.

The remainder of the body sheet metal is formed integrally with the floor pan 14 and includes a sheet metal roof 31 supported in elevated position above the passenger compartment. The support for the roof 31 is in the form of a pair of forward pillars, commonly referred to as "A" pillars and so designated in the drawings, disposed at opposite sides of the vehicle to form opposite sides of the windshield 32. The rear of the roof 31 is supported by integral side panels 33 disposed at opposite sides of the body and acting to form opposite sides of a rear window 34. An intermediate portion of the roof is supported by a pair of "B" pillars disposed rearwardly of the doors 36. The "B" pillars and the side panels 33 frame opposite sides of rear, side windows 35.

The doors 36 may be provided with an upper frame 38 for framing a sliding window glass panel or light 40. The glass is in the windshield 32, the door window 40 and rear window 34 have their lower edges substantially horizontally aligned along a line called a belt-line and designated at 42 in FIG. 1.

The various loads imposed on the sedan body 10 by the wheels 24 are absorbed through the floor pan and the roof 31. The strength necessary to transmit loads between the forward and rearward wheels is referred to as beaming strength, that is the strength necessary to resist distortion of the body between the front and rear wheels. The ability of the body to absorb diagonal loads between the front wheel at one side of the vehicle and the rear wheel at the opposite side of the vehicle is referred to as torsional strength.

Conversion of the vehicle body 10 is conducted from the interior of the body so as not to interfere with the under body structure and attachments such as the drive train, suspension, and the like. The conversion begins with the interior of the passenger car body 10 stripped of all interior trim such as carpeting, mats, moldings and the like. Also, the seats are completely removed.

Conversion continues with the installation of a reinforcing structure 46 which includes a main center section 48, a forward section 50, and a rear section 52 including a pair of rear extension members 54. All of the sections are of generally irregular, symmetrical configurations but have portions forming inverted U in cross sections.

Figure 9:
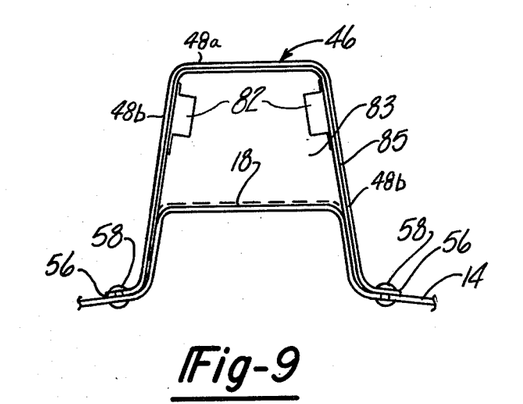
FIGS. 9, 10 and 11 are cross-sectional views at an enlarged scale taken generally on lines 9—9, 10—10 and 11—11, respectively in FIG. 7.
Figure 10:
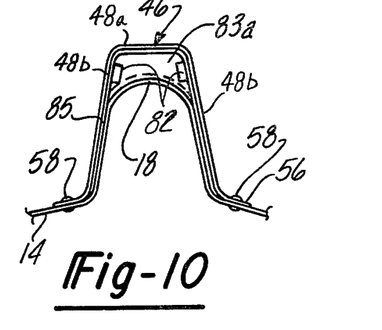
Figure 11:
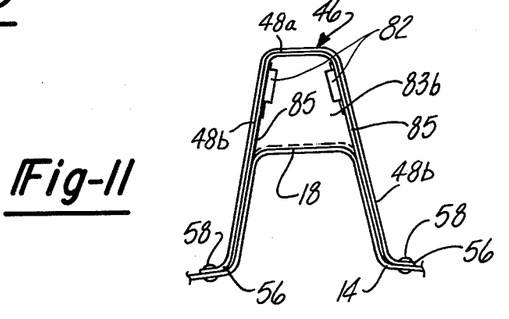

The center section 48 has an inverted U shaped cross section, and as shown in FIGS. 9, 10 and 11, has a vertical height greater than the corresponding section of the tunnel 18. The center section 48 has outwardly and oppositely extending flange portions 56 which are adapted to engage the floor pan 14 and to be fastened thereto. Fastening preferrably is conducted by the use of rivets 58. Additionally, the flange can be secured to the floor pan by the use of a structural polyurethane adhesive sealant between the flange portions 56 and the floor pan 14. Also, tunnel structures may be welded instead of riveted. With all methods of connection, the center section 48 forms a closed tubular structure with the tunnel 18. The center section 48 overlies the cross member or cross beam 25 and is secured thereto as shown at 49 in FIG. 3.

Figure 7:
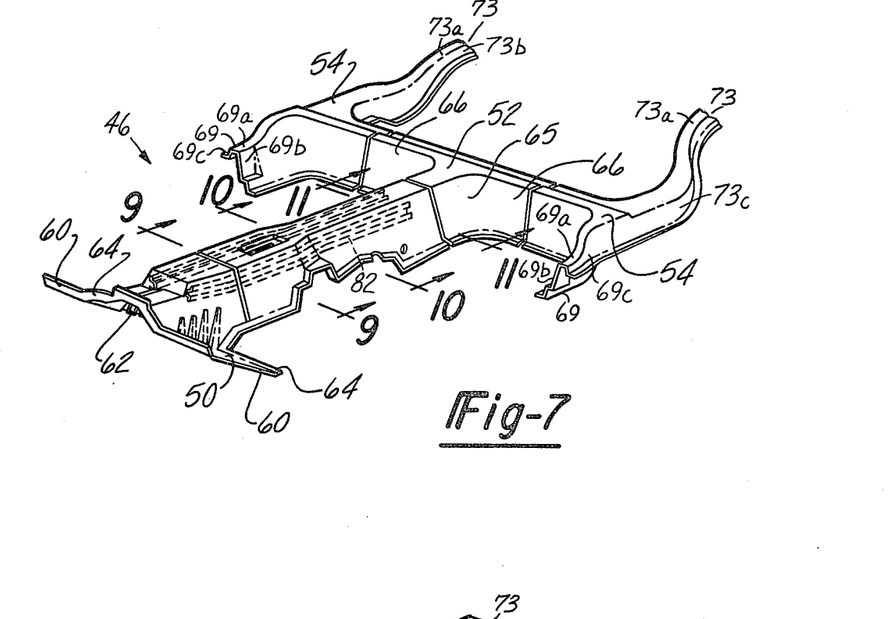
FIG. 7 is a perspective view of the reinforcing structure which is installed in the vehicle body.
Figure 8:
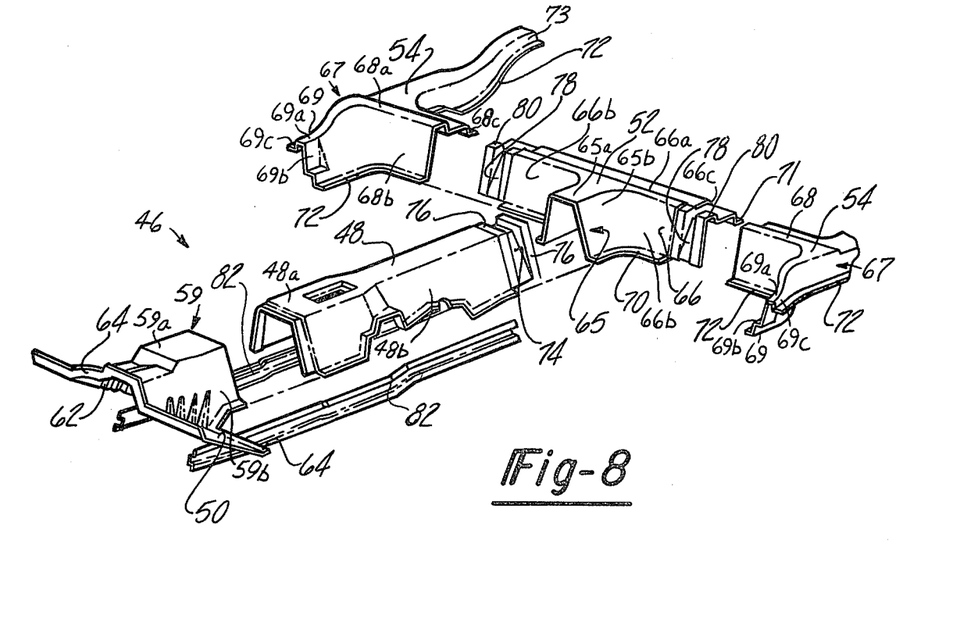
FIG. 8 is a view of the reinforcing structure of FIG. 7 with the parts in exploded relationship.

The forward section 50 of the reinforcing structure 46 includes a rearwardly projecting longitudinal portion 59 of U-shaped cross-section and having a configuration at its rearward end conforming generally to the forward end of the center surface 48. The longitudinal U-shaped portion 59 has a top wall 59a and depending side walls 59b (FIGS. 7 and 8). Oppositely extending wing portions 60 are formed integrally with the forward section 50. As seen in FIGS. 7 and 8, the wing portions 60 project in opposite directions transversely of the longitudinal axis of the vehicle. A plurality of inwardly and downwardly opening reinforcing channels 62 are formed on the side walls 59b and wing portion 60. When the wing portions 60 are fastened to the floor pan 14, the portions of the reinforcing channels on wing portions 60 form closed tubular structures for adding strength and rigidity to the merged constructions. The forward section 50 has attachment flanges 64 formed at the lower edges of the side walls 59b as well as the forward edges of the wing portions 60 and longitudinal portion 59 for securing the forward section 50 to the lower body assembly 45.

The rear section 52 of the reinforcing structure 46 has a forwardly projecting longitudinal portion 65 of U-shaped cross-section and a pair of rear extensions 54. Portion 65 is located generally in the mid-portion of section 52 and has a configuration at its forward end conforming generally to the rear end of the center section 48. The longitudinal U-shaped portion 65 has a top wall 65a and depending side walls 65b. Portion 65 merges with laterally extending portions 66 the outboard ends of which are adapted to be joined with the pair of rear extensions 54. Flanges 70 are are adapted to be fastened with rivets and adhesive to the floor pan 14. In addition, the rearward section 52 is provided with a rearward transverse flange 71 which is adapted to be fastened by way of adhesive and rivets to the rear deck 30. The side extensions 54 are provided with flanges 72 which are fastened by way of rivets and if desired, adhesive to the rear deck 30 and to the rear sub-frame members 22.

The rear section 52 is joined to the center section 48 by means of a joint construction which adds rigidity and helps to absorb torsional loads that are imposed on the tunnel structure 46. As best seen in FIG. 8, the joint includes a channel portion 74 formed adjacent the rear end of the center section 48. Opposite sides of the channel portion 74 are provided with seating surfaces 76 which abut the inside surface of the forward portion 65 of the rear section 52. The seating surfaces 76 and the rear section 52 can be joined together by welding or by the use of rivets and when so joined the composite structure forms a tubular construction affording great strength and rigidity in relation to the weight of the material used and acts to prevent buckling when large loads are imposed.

The outboard ends of the lateral extension 66 of the rear section 52 are also provided with a construction including channel portions 78 and seating surfaces 80 which are joined to the side extensions 54 in the same manner that the center section 48 is connected to the rear section 52. Again, this construction adds great strength with minimum weight.

Additional rigidity and strength can be obtained by the use of elongated members 82 seen in FIGS. 8 through 11 having a generally hat-shaped cross section. The members 82 are attached by welding or rivets to the inside surfaces of the tunnel structure 46 and form additional tubular reinforcing portions.

In some instances the reinforcing structure may be further strengthened by providing transverse bulkheads 83, 83a or 83b as seen in FIGS. 9, 10 and 11, respectively. The bulkheads 83, 83a and 83b have flanges 85 around the periphery of the bulkheads and which are attached to the tunnel 18 and reinforcing structure 46 by means of rivets or welding. Such bulkheads act to prevent buckling of the reinforcing structure.

In addition to the described manner in which the reinforcing structure 46 is connected to the floor pan 14, it also is connected directly to the reinforcing portions of the floor pan 14 such as connection of the forward section 50 to the forward sub-frames 20, the center section 48 to the cross members 25 and the rear section 52 to the rearward sub-frame 22. This connection also is made by way of rivets 58 or welding.

With the passenger compartment stripped of all lining materials to expose metal surfaces the reinforcing structure 46 can be installed. Preferably the center section 48 is installed followed by the addition of the forward and rearward sections 50 and 52 and the rearwardly extending sections 54. The connections are made by way of riveting and adhesive but welding may be used if reinforcement is installed prior to sheet metal painting.

After the reinforcing structure 46 is installed within the passenger compartment 29 of the body 10, removal of the top metal can be initiated. This can be accomplished by removal of all of the glass which includes the glass in the windshield 32, rear window 34, the side windows 35 and door windows 40. Thereafter the body 10 can be cut with a metal saw along the belt line 42 to sever the "B" pillars and side panels 33. In addition the roof panel 31 can be cut immediately rearwardly of the windshield header 84 and thereafter can be removed from the remainder of the body 10. In some conversions the "A" pillars forming opposite sides of the windshield 32 are cut at a line indicated at 86 and the windshield header 84 also is removed. In that case, the step of cutting the roof panel 32 rearwardly of the windshield header 84 can be omitted and the "A" pillars can be severed at the cut 86 and removed together with the roof panel 31.

With the roof construction and windshield header 84 removed the body can be further refined by the addition of a new windshield header 88 particularly adapted for receiving and detachably connecting to the forward edge 90 of a convertible, foldable and retractable top construction 92. The addition of a new header 88 makes it possible to lower the roof line of the convertible body 12 if so desired by removing a section of the "A" pillars.

In addition to removal of the roof structure 31 in some vehicles having a framed door 36 it is necessary to modify the doors by removing the frames 38. This also is accomplished by removing the frame 38 by sawing along the belt line 42, by removing the glass forming the window 40 and by substituting a new glass to accomodate the lowered roof line and the space fomerly occupied by the window frame 38.

Figure 12:
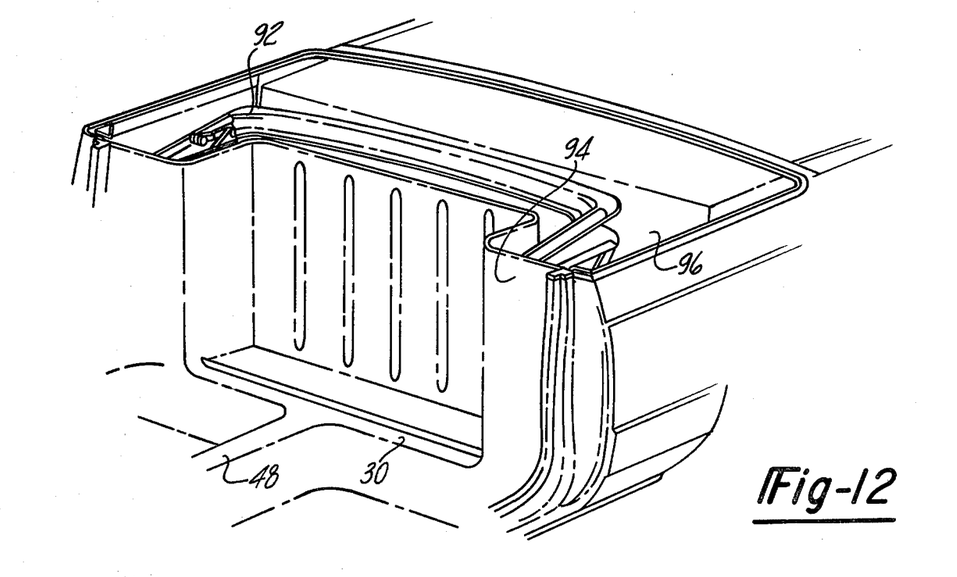
FIG. 12 is a perspective view of a portion of the vehicle body during the time that it is being modified.

In order to accomodate the folding top 92 a rearward portion of the passenger compartment is provided with a bulk-head 94 as seen in FIG. 12 which forms a cavity 96 to receive and to store the folding top 92. The interior of the passenger compartment can now be covered with carpeting and with lining material to cover all of the exposed surfaces and a rear seat may be included. Forward bucket seats 26 are installed in a conventional manner at opposite sides of the center section 48 of the tunnel structure 46. As seen in FIG. 1 the seating surface has a height approximately equal to the height of the tunnel structure 46. This makes it possible to obtain the maximum cross sectional area for the tunnel structure 46 to enhance its torsion absorbing capabilities.

Figure 13:
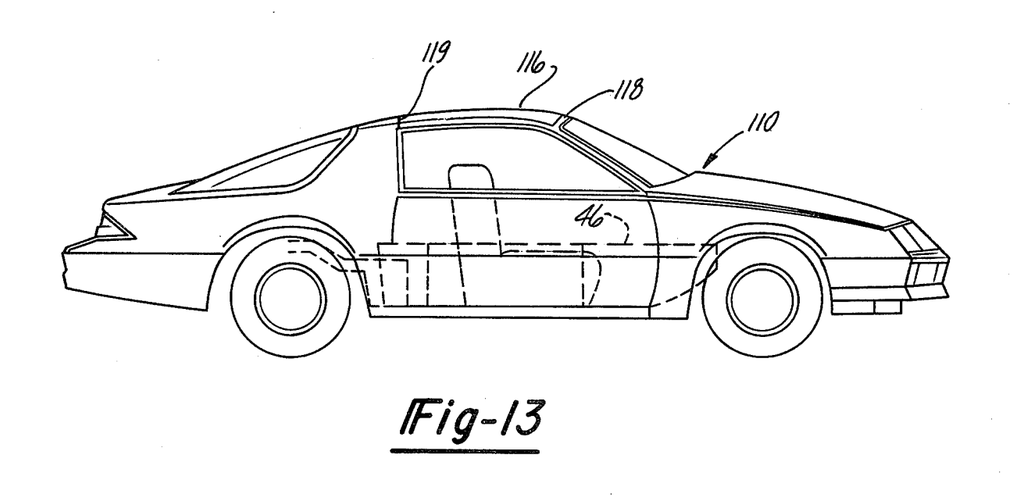
FIG. 13 is a view of another form of sedan vehicle which is modified.

Referring now to FIGS. 13 and 14, another embodiment of the invention is shown in which a two-door sedan type vehicle body 110 is converted to a targa type body 13. A targa type body is one in which the roof is completely removable to form an open passenger compartment as seen in FIG. 14. Vehicles of this type also are subject to beaming and torsional loads which must be resisted by structure added to replace the typical integral roof panel 116.

The sedan body 110 is slightly different than the vehicle body 10 but can be considered as incorporating a floor pan and suspension supports very similar to the floor pan 14 and suspension supports 20 and 22.

In this embodiment of the invention, the interior of the passenger compartment is stripped of all carpeting, lining and moldings to expose the metal surfaces after which a reinforcing tunnel structure 46 is installed in the same manner as in the body 10. Thereafter, the roof 116 is cut immediately to the rear of the windshield header 118 and along a line 119 substantially in alignment with the rear edge of the upper portion of the door opening. Thereafter, a forward frame member 122 is attached to the metal edge immediately to the rear of the windshield header 118 and a rearward frame member 124 is attached to the cut edge 119 to the rear of the opening formed by removing the roof section. The frames 122 and 124 can be additionally modified to receive seal members engageable with the detachable panel 114.

It will be noted that in both embodiments of the invention, the reinforcing tunnel structure 46 is installed prior to any modification of the roof 31 or 116. In this manner, the original structural integrity of the body 10 or 110 can be maintained without the necessity of blocking or otherwise supporting the vehicle body.

With reference to FIGS. 1–3 and 6–12, the present invention includes a vehicle body 10 in which the load carrying roof 31 has been removed. The vehicle body has a lower body assembly indicated collectively by reference numeral 45 (FIGS. 2 and 3) comprising a generally flat floor pan 14 with forward and rear suspension supporting sub frames 20, 22, respectively projecting forwardly and rearwardly from the floor pan. A reinforcement structure indicated collectively by reference numeral 46 is secured to the lower body assembly 45 for adding torsional and bending strength to compensate for removal of the load carrying roof 31.

The reinforcement structure 46 comprises a center section 48 (FIGS. 2, 3, 7 and 8) extending along the longitudinal axis of the vehicle body and connected to the lower body assembly 45 to form with the floor pan 14 a hollow tubular longitudinal beam (FIGS. 9–11) to resist bending forces about axes transverse to the longitudinal axis and to resist torsional forces about the longitudinal axis. The reinforcement structure 46 also includes a front section 50 at one end of the center section 48 which is connected to the forward sub frame 20 to transmit torsional and bending forces from the forward sub frame 20 to the center section; and a rear section 52 at the other end of the center section 48 which is connected to the rear sub frame 22. A transversely extending rear bulkhead 30a connects the floorpan 14 and rear deck 30 (FIG. 6). The rear section 52 straddles the bulkhead 30a and is connected to the lower body assembly 45 so as to form with the floor pan 14 and rear deck 30 a transverse beam 53 (FIG. 1) for transmitting torsional and bending forces from the rear sub frame 22 to the center section 48.

The rear section 52 is made up of a forwardly projecting longitudinal segment 65 located generally in the mid-portion of the rear section, and end portions 67 (FIGS. 3, 7 and 8) which cooperate to form the transverse beam 53 (FIG. 3) extending transversely across the width of the lower body assembly 45.

Figure 3:
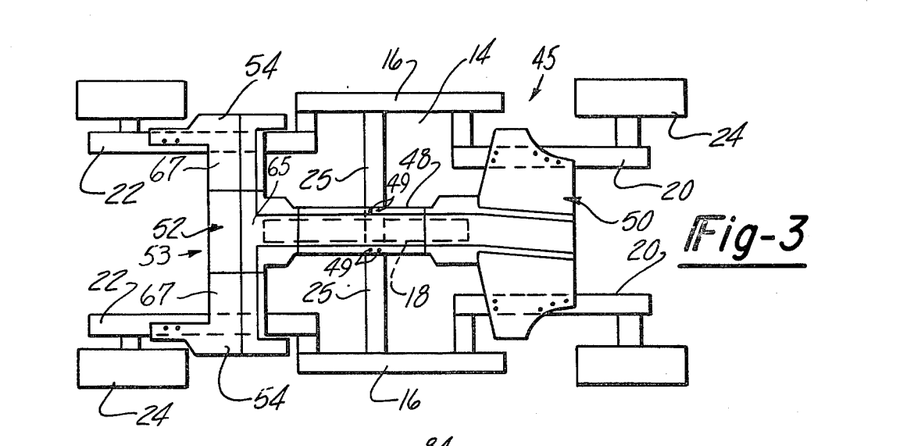
FIG. 3 is a top view of the floor pan of a vehicle body being modified.

The rear extension members 54 are formed as a part of the rear section 52 and project from opposite ends of the transverse beam 53. As shown in FIG. 3, the rear extension members 54 project from the transverse beam 53 and are spaced from each other on opposite sides of the longitudinal axis, and are connected with the lower body assembly to transmit bending and torsional forces from the rear sub frame 22 to the transverse beam 53.

With reference to FIGS. 7–11, the center section 48 of the reinforcement structure 46 has an inverted U-shaped cross section including a top wall 48a and a pair of side walls 48b depending therefrom. The outwardly projecting attachment flanges 56 are formed on the lower edges of the side walls 48b, and rivets 58 connect the attachment flanges 56 to the floor pan 14 (FIGS. 9–11).

The front section 50 of the reinforcement structure 46 includes a rearwardly projecting longitudinal segment 59 (FIGS. 7 and 8) which is joined to the forward end of the center section 48 and has an inverted U-shaped cross section including a top wall 59a and a pair of side walls 59b depending therefrom and secured at their lower edges to the floor pan by rivets and the attachment flange 64. The front section also includes a pair of wing portions 60 projecting outwardly from the longitudinal segment 59. The wing portions 60 overlie the forward sub frame 20 and are connected thereto.

As shown in FIGS. 7–11, elongated stiffener means 82 are secured to the center section 48 and the longitudinal segment 59 of the front section 50. The stiffener means includes a pair of elongated hat shaped members 82 (FIGS. 9, 11) extending along the length of the center section 48 and the longitudinal segment 49 of the front section 50 (FIG. 7). The hat shaped members are secured to the inner surface of the side walls 48b (FIGS. 9–11).

Transverse bulkheads 83, 83a and 83b (FIGS. 9, 11) are disposed within the center section 48 and attached to the inner surfaces of the hollow longitudinal beam formed thereby. The bulkheads are spaced longitudinally from each other along the length of the longitudinal beam as indicated in FIGS. 7 and 9–11.

The rear section 52 of the reinforcement structure includes a forwardly projecting longitudinal segment 65 which is joined to the end of the center section 48 opposite the front section 50. The forwardly projecting segment 65 has an inverted U-shaped cross section including a top wall 65a and a pair of side walls 65b depending therefrom and secured to their lower edges to the floor pan by rivets engaging attachment flanges 70.

The rear section 52 further includes a pair of outwardly projecting transverse segments 66 projecting from the forwardly projecting longitudinal segment 65 (FIGS. 7 and 8). The outwardly projecting transverse segments have a top wall 66a merging with the top wall 65a of the longitudinal segment 65, front walls 66b each merging with a respective side wall 65b of the segment 65, and a continuous rear wall 66c spaced from the front walls 66b and depending from the edge of the top wall 66a opposite the front walls. The front walls 66b and rear walls 66a are secured at the lower edges to the floor pan by rivets engaged with attachment flanges 70 and 71.

Each of the end portions 67 of the rear section 52 includes an inwardly projecting transverse segment 68 joined to the end of an associated outwardly projecting transverse segment 66 of the mid portion. The inwardly projecting segments 68 have top, front and rear walls 68a, 68b and 68c forming continuations of the top, front and rear walls 66a, 66b and 66c of the associated outwardly projecting transverse segments 66. The front and rear walls 68b and 68c are secured at the lower ends to the floor pan by rivets engaging attachment flanges 72.

The rear extension members 54 are formed on the end portion 67. Each extension member 54 has leading and trailing segments 69 and 73 projecting forwardly and rearwardly, respectively, of the associated inwardly projecting transverse segment 68. The leading segment 69 has top, inner side and outer side walls 69a, b and c, respectively. The top wall 69a merges with the top wall 68a and the inner side wall 69b merges with wall 68b. The trailing segment 73 has a top wall 73a, and inner side walls 73b and and outer side wall 73c. The top wall 73a merges with the top wall 68a, the inner side wall 73b merges with wall 68c, and the outer side wall 73c merges with wall 69c. The lower edges of the inner and outer side walls are secured to the floor pan and rear sub frame by rivets engaging attachment flanges 72.

The embodiments of the invention in which an exclusive property or privilege is claimed are defined as follows:

1. A vehicle body in which the load carrying roof has been removed and which has a lower body assembly comprising a floor pan with forward and rear suspension supporting sub frames respectively projecting forwardly and rearwardly therefrom, the improvement comprising a reinforcement structure secured to said lower body assembly for adding torsional and bending strength to compensate for removal of the load carrying roof, said reinforcement structure comprising: a center section extending along the longitudinal axis of the vehicle body and connected to said lower body assembly to form with said floor pan a hollow tubular longitudinal beam to resist bending forces about axes transverse to the longitudinal axis and to resist torsional forces about the longitudinal axis; a front section at one end of said center section connected to said lower body assembly to transmit torsional and bending forces from said forward sub frame to said center section; a rear section at the other end of said center section connected to said lower body assembly to form with said floor pan a transverse beam for transmitting torsional and bending forces from said rear sub frame to said center section; said rear section including a pair of rear extension members having leading and trailing segments projecting forwardly and rearwardly, respectively, from said transverse beam in a spaced relationship from each other on opposite sides of the longitudinal axis; and said extension members being connected with said lower body assembly to transmit bending and torsional forces from said rear sub frame to said transverse beam.

2. A vehicle body as claimed in claim 1, wherein said center section of said reinforcement structure has an inverted U-shaped cross section including a top wall and a pair of side walls depending therefrom, the lower edge of said side walls being secured to said floor pan.

3. A vehicle body as claimed in claim 2 further including outwardly projecting attachment flanges formed on the lower edges of said side walls of said center section, and means connecting said attachment flanges to said floor pan.

4. A vehicle body as claimed in claim 3 wherein said front section of said reinforcement structure includes a rearwardly projecting longitudinal segment joined to one end of said center section and having an inverted U-shaped cross-section including a top wall and a pair of side walls depending therefrom and secured at their lower edges to said floor pan.

5. A vehicle body as claimed in claim 4 wherein said front section includes a pair of wing portions projecting outwardly from said longitudinal segment, said wing portions overlying said forward sub frame and being connected thereto.

6. A vehicle body as claimed in claim 5 further including elongated stiffener means secured to said center section and the longitudinal segment of said front section.

7. A vehicle body as claimed in claim 6 wherein said stiffener means includes a pair of elongated hat-shaped members extending along the length of the center section and the longitudinal segment of said front section and secured to the inner surface of the side walls thereof.

8. A vehicle body as claimed in claim 7 wherein a plurality of transverse bulkheads are disposed within said center section and attached to the inner surfaces of the hollow longitudinal beam formed thereby, said bulkheads being spaced longitudinally from each other.

9. A vehicle body as claimed in claim 8 wherein said rear section of said reinforcement structure includes a forwardly projecting longitudinal segment joined to the end of said center section opposite said front section, said forwardly projecting segment having an inverted U-shaped cross-section including a top wall and a pair of side walls depending therefrom and secured at their lower edges to said floor pan.

10. A vehicle body as claimed in claim 9 wherein said rear section further includes a pair of outwardly projecting transverse segments projecting from said forwardly projecting longitudinal segment, said outwardly projecting transverse segments having a top wall merging with the top wall of the forwardly projecting longitudinal segment, front walls each merging with a respective side wall of the forwardly projecting longitudinal segment, and a continuous rear wall spaced from said front walls and depending from the edge of said top wall opposite said front walls, said front walls and rear wall being secured at their lower edges to said floor pan.

11. A vehicle body as claimed in claim 10 wherein said rear section includes a mid-portion and a pair of end portions secured to opposite ends of the mid-portion, said mid-portion including said forwardly projecting longitudinal segment and said pair of transverse segments.

12. A vehicle body as claimed in claim 11 wherein each of said end portions includes an inwardly projecting transverse segment joined to the end of a respective one of said outwardly projecting transverse segments of said mid-portion, said inwardly projecting segments having top, front and rear walls forming continuations of the top, front and rear walls of the associated outwardly projecting transverse segment, said walls and rear walls of the inwardly projecting transverse segments being secured at their lower ends to said floor pan.

13. A vehicle body as claimed in claim 1 wherein the leading and trailing segments have top walls, inner side walls and outer side walls merging respectively with the top, front and rear walls of the associated inwardly projecting transverse segment, the lower edges of the inner and outer side walls being secured to said floor pan and rear sub frame.

14. A vehicle body as claimed in claim 1, 10 or 13 wherein said floor pan is formed with an elevated deck with a transversely extending rear bulkhead connecting said rear deck and floor pan, said rear section straddling said rear bulkhead and being connected to said floor pan and rear deck on opposite sides of said rear bulkhead to form said transverse beam.

15. A vehicle body as claimed in claim 10 or 13 wherein said lower body assembly is formed with a rear deck portion elevated with respect to said floor pan and a transversely extending rear bulkhead that extends between said rear deck and said floor pan, and wherein said outwardly projecting transverse segments of said rear section straddle said bulkhead with the front walls thereof secured to said floor pan and the rear wall thereof secured to said deck portion on the opposite side of said bulkhead from said front walls.

16. A vehicle body as claimed in claim 15 wherein a pair of rocker panels are secured to and extend along opposite side edges of the floor pan in parallel relationship with the longitudinal axis; and a transverse cross beam that extends between said rocker panels in spaced relationship with said rear bulkhead with said cross beam being connected at its ends to said rocker panels and along its length to said floor pan.

17. A vehicle body in which the load carrying roof has been removed and which has a lower body assembly comprising a floor pan with forward and rear suspension supporting sub frames respectively projecting forwardly and rearwardly therefrom, the improvement comprising a reinforcement structure secured to said lower body assembly for adding torsional and bending strength to compensate for removal of the load carrying roof, said reinforcement structure comprising: a center section extending along the longitudinal axis of the vehicle body and connected to said lower body assembly to form with said floor pan a hollow tubular longitudinal beam to resist bending forces about axes transverse to the longitudinal axis and to resist torsional forces about the longitudinal axis; a front section at one end of said center section connected to said lower body assembly to transmit torsional and bending forces from said forward sub frame to said center section; a rear section at the other end of said center section connected to said lower body assembly to form with said floor pan a transverse beam for transmitting torsional and bending forces from said rear sub frame to said center section; said rear section including a mid-portion having a forwardly projecting longitudinal segment connected to the center section; the mid-portion also having opposite ends; the rear section also including a pair of end portions connected to the ends of the mid-portion; and joints formed at the junction of said center section with the forwardly projecting longitudinal segment of the mid-portion of said rear section and at the junctions of said mid-portion with said end portions of said rear section, said joints including channels formed at the respective junctions and having seating surfaces formed on opposite sides of said channels such that the seating surfaces seat against the mating sections and portions and bridge said channels.

18. A vehicle body as claimed in claim 5 or 13 further including downwardly opening reinforcing channels formed in the side walls of the rearwardly projecting longitudinal segment of said front section and in said wing portions.

19. A reinforcement structure for a vehicle having a lower body assembly with a sheet metal floor pan and forward and rear suspension supporting sub frames projecting respectively forwardly and rearwardly from the floor pan, said reinforcement structure comprising:

a center section adapted to be secured to the floor pan along its longitudinal axis, said center section having an inverted U-shaped cross section with a top wall and a pair of depending side walls formed with attachment flanges at their lower edges for securing the center section to the floor pan on opposite sides of the longitudinal axis;

a front section at one end of said center section including a rearwardly projecting longitudinal segment joined to one end of said center section and having in inverted U-shaped cross section including a top wall and a pair of side walls depending therefrom and mating with the top and side walls, respectively, of the center section;

said front section further including a pair of wing portions projecting outwardly from said longitudinal segment;

a rear section at the end of said center section opposite said front section, said rear section including a forwardly projecting longitudinal segment joined to the end of said center section opposite said front section, said forwardly projecting segment having an inverted U-shaped cross section including a top wall and a pair of side walls depending therefrom and mating with the corresponding top and side walls of said center section;

said rear section further including a pair of outwardly projecting transverse segments projecting from said forwardly projecting longitudinal segment, said outwardly projecting transverse segments having a top wall merging with the top wall of the forwardly projecting longitudinal segment, front walls each merging with a respective side wall of the forwardly projecting longitudinal segment, and a continuous rear wall spaced from said front walls and depending from the edge of said top wall opposite said front walls; and said rear section also including a pair of rear extension members having leading and trailing segments projecting forwardly and rearwardly, respectively, from said transverse segments in a spaced relationship from each other on opposite sides of the longitudinal axis; and said extension members being connected with said lower body assembly to transmit bending and torsional forces from said rear sub frames to said transverse segments.

20. A reinforcement structure for a vehicle having a lower body assembly with a sheet metal floor pan and forward and rear suspension supporting sub frames projecting respectively forwardly and rearwardly from the floor pan, said reinforcement structure having a rear section mid-portion having a forwardly projecting longitudinal segment having a forward end, said segment having an inverted U-shaped cross section extending rearwardly from said forward end and including a top wall and a pair of side walls depending therefrom; a pair of outwardly projecting transverse segments projecting from said longitudinal segment, said outwardly projecting transverse segments having a top wall merging with the top wall of the forwardly projecting longitudinal segment, the front walls each merging with a respective side wall of the forwardly projecting longitudinal segment, and a continuous rear wall spaced from said front walls and depending from the edge of said top wall opposite said front wall; and a pair of rear extension members having leading and trailing segments projecting forwardly and rearwardly, respectively, from said transverse segments in a spaced relationship from each other on opposite sides of the longitudinal segment of the mid-portion, said rear extension members being connected with said lower body assembly to transmit bending and torsional forces from said sub frames to said rear transverse segments.

21. A reinforcement structure for a vehicle having a lower body assembly with a sheet metal floor pan and forward and rear suspension supporting sub frames projecting respectively forwardly and rearwardly from the floor pan, said reinforcement structure including a rear section end portion comprising an inwardly projecting segment adapted to extend transversely of the longitudinal axis of the vehicle, said inwardly projecting segment having a top wall and front and rear walls depending therefrom; a pair of rear extension members having leading and trailing segments projecting forwardly and rearwardly, respectively, of the inwardly projecting transverse segment; said leading and trailing segments having top walls, inner side walls and outer side walls merging respectively with the top, front and rear walls of the inwardly projecting transverse segment.

* * * * *